United States Patent
Bonner et al.

(10) Patent No.: US 12,510,441 B2
(45) Date of Patent: Dec. 30, 2025

(54) DAMAGE DETECTION SYSTEM

(71) Applicant: Three Smith Group Limited, West Yorkshire (GB)

(72) Inventors: Mark Bonner, West Yorkshire (GB); David Edgar, West Yorkshire (GB); Milos Bozic, West Yorkshire (GB)

( * ) Notice: Subject to any disclaimer, the term of this patent is extended or adjusted under 35 U.S.C. 154(b) by 204 days.

(21) Appl. No.: 18/289,691

(22) PCT Filed: Feb. 10, 2022

(86) PCT No.: PCT/GB2022/050359
§ 371 (c)(1),
(2) Date: Nov. 6, 2023

(87) PCT Pub. No.: WO2022/234241
PCT Pub. Date: Nov. 10, 2022

(65) Prior Publication Data
US 2024/0255385 A1    Aug. 1, 2024

(30) Foreign Application Priority Data
May 7, 2021   (GB) .................................. 2106512

(51) Int. Cl.
*G01M 99/00*       (2011.01)

(52) U.S. Cl.
CPC .................... *G01M 99/00* (2013.01)

(58) Field of Classification Search
CPC ............. G01M 99/00; G01R 33/0017; G01R 33/0094; G01R 33/02; G01N 27/72; G01N 27/82; G01N 27/83
See application file for complete search history.

(56) References Cited

U.S. PATENT DOCUMENTS

| | | | |
|---|---|---|---|
| 2003/0010108 A1* | 1/2003 | Goslar | G01B 7/16 73/146 |
| 2006/0068754 A1 | 3/2006 | Goldfarb | |
| 2007/0040068 A1 | 2/2007 | Bartonek | |
| 2008/0109190 A1* | 5/2008 | Bauer | B60R 21/0134 702/189 |

(Continued)

FOREIGN PATENT DOCUMENTS

| | | |
|---|---|---|
| CN | 112162030 A | 1/2021 |
| JP | 2018004555 A | 1/2018 |

OTHER PUBLICATIONS

International Application No. PCT/GB2022/050359, filed Feb. 10, 2022, International Search Report and Written Opinion, issued Apr. 21, 2022, 11 pages.

(Continued)

*Primary Examiner* — Alvaro E Fortich
(74) *Attorney, Agent, or Firm* — Mueting Raasch Group (57) ABSTRACT

A damage detection system for monitoring a magnetised structure for damage comprising: a magnetometer; and a controller configured to: receive a first magnetic field signal of the magnetised structure from the magnetometer; receive a second magnetic field signal of the magnetised structure from the magnetometer; determine magnetic field displacement data based on the second magnetic field signal and the first magnetic field signal; and determine a condition of the magnetised structure based on the magnetic field displacement data.

20 Claims, 4 Drawing Sheets

(56) References Cited

U.S. PATENT DOCUMENTS

| | | | |
|---|---|---|---|
| 2009/0001976 A1* | 1/2009 | Cech | B60R 21/0136 |
| | | | 324/228 |
| 2009/0319212 A1 | 12/2009 | Cech et al. | |
| 2018/0210039 A1* | 7/2018 | Shalev | G01V 3/081 |
| 2019/0088119 A1 | 3/2019 | O'Callaghan | |

OTHER PUBLICATIONS

Chilean Office Action and Search Report got Application No. 202303292, issued by the Chile Patent Office on Jun. 30, 2025; 30 pgs. including English translation.

* cited by examiner

DAMAGE DETECTION SYSTEM

This application is the § 371 U.S. National Stage of International Application No. PCT/GB2022/050359, filed Feb. 10, 2022, which claims the priority to European App. No. 2106512.3, filed May 7, 2021, the disclosures of which are incorporated by reference herein in their entireties.

FIELD

The present disclosure relates to a damage detection system and a method for detecting damage in a magnetised structure.

SUMMARY

According to a first aspect of the present disclosure, there is provided a damage detection system for monitoring a magnetised structure for damage comprising:
  a safety structure comprising:
    the magnetised structure, wherein the magnetised structure comprises ferromagnetic material and creates its own magnetic field; and
    a magnetometer; and
  a controller configured to:
    receive a first magnetic field signal of the magnetised structure from the magnetometer;
    receive a second magnetic field signal of the magnetised structure from the magnetometer;
    determine magnetic field displacement data based on the second magnetic field signal and the first magnetic field signal; and
    determine a condition of the magnetised structure based on the magnetic field displacement data.

The damage detection system can advantageously monitor the condition of structures susceptible to damage and detect damage that may otherwise go unnoticed or undetected.

The controller may be configured to determine the magnetic field displacement data based on a difference or ratio between the first magnetic field signal and the second magnetic field signal along one or more axes.

The magnetic field displacement data may comprise a magnetic field displacement along one or more axes.

The controller may be further configured to receive a plurality of further magnetic field signals and determine the magnetic field displacement data based on the further magnetic field signals.

The controller may be configured to determine the condition of the magnetised structure based on a magnitude of a magnetic field displacement in one or more axes.

The controller may be configured to determine the condition of the magnetised structure by comparing the magnitude of the magnetic field displacement in one or more axes to one or more condition thresholds.

The condition of the magnetised structure may comprise:
  a damage level of the magnetised structure; and/or
  an assembly status of the magnetised structure.

The controller may be configured to receive the first magnetic field signal as a calibration magnetic field signal as part of a calibration routine. The controller may perform the calibration routine at any time including: a time of manufacture, a time of installation, a time of assembly, a time of re-assembly, a time of service, a time of repair and/or a time of relocation.

The controller may be configured to update the first magnetic field signal based on the second magnetic field signal.

The controller may be configured to output a condition signal indicative of the condition of the magnetised structure.

The damage detection system may further comprise an audible and/or visual indicator. The controller may be configured to output the condition signal by activating the audible and/or visual indicator.

The controller may be configured to output the condition signal by transmitting condition data and/or the magnetic field displacement data to an external controller.

The controller may be co-located with the magnetometer. The controller may be coupled to the magnetometer via a network. The controller may comprise a plurality of processors distributed between being co-located with the magnetometer or coupled to the magnetometer via the network.

The controller may be further configured to:
  receive trigger signalling;
  selectively activate the magnetometer in response to the trigger signalling; and
  receive a magnetic field from the magnetometer.

The trigger signalling may comprise a periodic trigger signal for selectively activating the magnetometer and receiving a magnetic field according to a monitoring schedule.

The trigger signalling may comprise an on-demand signal from a trigger sensor. The trigger sensor may be responsive to:
  motion of an object within a predetermined radius of the magnetometer; and/or
  impact of an object with the magnetised structure.

The damage detection system may comprise the trigger sensor.

The trigger sensor may comprise an optical sensor. The trigger sensor may comprise a mechanical sensor. The trigger sensor may comprise a vibration sensor or an impact sensor. The trigger sensor may comprise an accelerometer. The trigger sensor may comprise a receiver.

The controller may be further configured to:
  receive an on-demand magnetic field signal from the magnetometer; and
  determine magnetic field displacement data based on the on-demand magnetic field signal and the first reference magnetic field signal; and
  determine if the object is a vehicle in response to the magnetic field displacement data exceeding one or more displacement thresholds.

The damage detection system may further comprise an output signal generator. The controller may be configured to activate the output signal generator in response to the magnetic field displacement data exceeding the one or more displacement thresholds.

The controller may be configured to:
  receive a plurality of on-demand magnetic field signals from the magnetometer;
  determine transient magnetic field displacement data comprising a plurality of magnetic field displacements corresponding to a difference or ratio between a corresponding on-demand magnetic field signal and the first magnetic field signal; and
  determine any of a position, speed, velocity, trajectory or presence of the object or a transient damage profile of the magnetised structure based on the transient magnetic field displacement data.

The controller may be further configured to:
receive a first supplementary magnetic field signal and a second supplementary magnetic field signal from a second magnetometer monitoring the magnetised structure;
determine supplementary magnetic field displacement data for the magnetised structure based on the first supplementary magnetic field signal and the second supplementary magnetic field signal; and
determine a location of damage on the magnetised structure based on a comparison between the magnetic field displacement data and the supplementary magnetic field displacement data.

The damage detection system may comprise one or more magnetic elements for magnetising a structure. The magnetic elements may comprise any of: magnetic strips, magnetic plates, magnetic tape, magnetic particles and/or magnetic paint.

At least the magnetometer may be positioned within a safety structure. The safety structure may comprise any of: a safety barrier, a safety bollard, a safety rail, a post for a safety rail, a collision sensor or a component part thereof.

The damage detection system may further comprise:
a plurality of magnetometers, wherein each magnetometer is coupled to a corresponding transceiver; and
a server configured to communicate with each of the plurality of magnetometers via the corresponding transceiver.

The server may comprise the controller.

The damage detection system may further comprise a plurality of controllers each configured to receive reference and measurement magnetic fields from a corresponding magnetometer.

The safety structure may comprise a structure for protecting or segregating assets or pedestrians from vehicles or a structure for protecting or segregating pedestrians from hazard areas.

The safety structure may comprise any of: a safety barrier, a safety bollard, a safety rail, a post for a safety rail, a bumper, a collision sensor, racking, guards, machine guarding, machine fencing, a combination thereof or a component part thereof.

The magnetised structure may comprise any of: a safety barrier, a safety bollard, a safety rail, a post for a safety rail, a bumper, racking, guards, machine guarding or machine fencing.

The magnetised structure may comprise a polymer safety structure and one or more magnetic elements for magnetising the polymer safety structure.

The one or more magnetic elements may comprise one or more of:
a lining of magnetic material on the polymer safety structure;
an infusion of magnetic material in the polymer safety structure;
magnetic material embedded in the safety polymer structure; and
a magnetic strip, a magnetic plate, magnetic tape, magnetic particles and/or
magnetic paint affixed to the polymer safety structure.

The polymer safety structure may comprise any of: a safety barrier, a safety bollard, a safety rail, a post for a safety rail, a bumper, racking, guards, machine guarding or machine fencing. The polymer safety structure may comprise a structure for protecting or segregating assets and/or pedestrians from vehicles or a structure for protecting or segregating pedestrians from hazard areas.

According to a second aspect of the present disclosure there is provided a magnetised safety structure comprising any of the damage detection systems disclosed herein, wherein the safety structure comprises any of: a safety barrier, a safety bollard, a safety rail, a post for a safety rail, a collision sensor or a component part thereof.

According to a third aspect of the present disclosure, there is provided a magnetised safety barrier system comprising:
any of the damage detection systems disclosed herein;
a second magnetometer; and
a magnetised safety barrier,
wherein the magnetometer is associated with a first end of the magnetised safety barrier and the second magnetometer is associated with a second end of the magnetised safety barrier.

The magnetised safety barrier may comprise:
a safety barrier;
a wire extending through an opening along an axis of the safety barrier; and
a plurality of magnetic elements affixed to and spaced along a length of the wire.

The wire may be held under tension. The magnetic elements may be periodically spaced along the length of the wire.

The first magnetometer and second magnetometer may be coupled to respective first and second support structures at respective ends of the magnetised safety barrier.

The controller may be configured to:
receive a plurality of further magnetic field signals from the magnetometer;
receive a plurality of further supplementary magnetic field signals from the second magnetometer;
determine first dynamic magnetic field displacement data based on a difference between each of the further magnetic field signals and the first magnetic field signal;
determine supplementary dynamic magnetic field displacement data based on a difference between each of the supplementary magnetic field signals and the first supplementary magnetic field signal; and
determine an impact force based on oscillation parameters of the first dynamic magnetic field displacement data and/or the supplementary dynamic magnetic field displacement data.

According to a fourth aspect of the present disclosure, there is be provided a network system comprising a server connected to a plurality of any of the damage detection systems disclosed herein or connected to a plurality of any of the safety structures disclosed herein.

According to a fifth aspect of the present disclosure there is provided a method of installing any of the damage detection systems disclosed herein, comprising the steps of:
applying magnetic elements to a structure to provide the magnetised structure; and
coupling the damage detection system to the magnetised structure.

According to a sixth aspect of the present disclosure, there is provided a computer implemented method for monitoring a magnetised structure for damage comprising the steps of:
receiving a first reference magnetic field of the magnetised structure from a magnetometer arranged to monitor the magnetised structure;
receiving a second reference magnetic field of the magnetised structure from the magnetometer;
determining magnetic field displacement data based on the second reference magnetic field and the first reference magnetic field; and determining a condition of the magnetised structure based on the magnetic field displacement data.

According to a further aspect of the present disclosure there is provided a damage detection system for monitoring a magnetised structure for damage comprising:
a magnetometer; and
a controller configured to:
receive a first magnetic field signal of the magnetised structure from the magnetometer;
receive a second magnetic field signal of the magnetised structure from the magnetometer;
determine magnetic field displacement data based on the second magnetic field signal and the first magnetic field signal; and
determine a condition of the magnetised structure based on the magnetic field displacement data.

BRIEF DESCRIPTION OF THE DRAWINGS

One or more embodiments will now be described by way of example only with reference to the accompanying drawings in which.

DETAILED DESCRIPTION

Many structures can pose a safety hazard when damaged, for example bridges, buildings and equipment. One damage pathway is a vehicle collision with the structure. For example, in a factory or warehouse environment, vehicles may be required to move within confined spaces and in close proximity to valuable goods and personnel. In a warehouse, forklift trucks (FLTs) may pass between isles of racking or shelving that contain valuable stock. A FLT may have to perform tight turns and manoeuvres to load and unload stock from the racking. Even a skilled driver may accidently collide with racking causing damage and creating a potential safety hazard from the racking collapsing, particularly if the collision is not detected or goes unreported.

Collision sensors on structures can alleviate this risk by detecting and reporting collisions. However, collision sensors may generate many false alarms from non-damaging collisions resulting from a pedestrian brushing past the structure or other minor vibration events.

The damage detection system disclosed herein may be suitable for use with any structure for which it may be advantageous to monitor the structural integrity of the structure and/or collisions or impacts with the structure.

Figure 1:
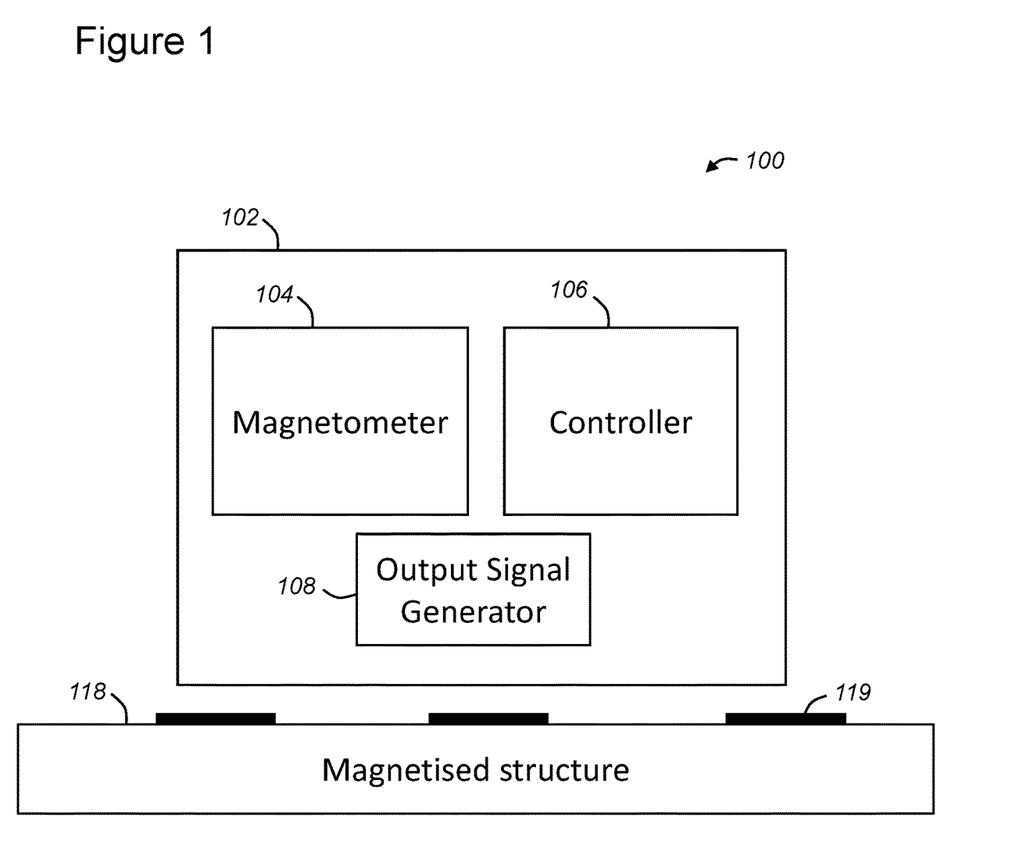
FIG. 1 illustrates a schematic overview of a damage detection system for monitoring a magnetised structure according to an embodiment of the present disclosure.

FIG. 1 illustrates a schematic overview of a damage detection system 100 for monitoring a magnetised structure 118 according to an embodiment of the present disclosure. The damage detection system 100 (referred to herein as the system 100) comprises a magnetometer 104 and a controller 106. The controller 106 is configured to receive magnetic field signals from the magnetometer 104. The magnetic field signals include: (i) a first magnetic field signal associated with the magnetised structure providing a background or calibration reference magnetic field at a first time; and (ii) a second magnetic field signal associated with the magnetised structure providing a test magnetic field at a second time after the first time. The controller 106 determines magnetic field displacement data based on a difference between the second magnetic field signal and the first magnetic field signal. The controller 106 can then determine a condition of the magnetised structure 118 if the magnetic field displacement data indicates a difference greater than a condition threshold. In this example, the controller 106 can output the condition of the magnetised structure 118 using an output signal generator 108.

A magnetised structure 118 should be understood to be a structure that contains ferromagnetic material and creates its own magnetic field, for example a permanent magnet. In some examples, the magnetised structure 118 may be inherently magnetic. For example, the magnetised structure 118 may comprise a ferromagnetic material and/or magnetic particles and be subjected to a magnetisation process to being formed into the magnetised structure 118. The structure may be lined or infused with magnetic material. In other examples, a non-ferromagnetic structure may be magnetised by the application of magnetic elements 119 to form the magnetised structure 118. For example, magnetic elements 119 may be applied or affixed to an aluminium or carbon composite safety structure. The magnetic elements 119 may comprise any of magnetic strips, magnetic plates, magnetic tape, magnetic particles or magnetic paint. The magnetic elements 119 may be applied or affixed to a structure using adhesive or mechanical fixings. In some examples, the magnetic elements 119 may be applied to a ferromagnetic and/or magnetised structure to enhance the strength of the magnetic field of the magnetised structure 118.

As an example, one or more magnetised elements (referred to herein as magnetic elements) may be added to a polymer safety structure to magnetise the (non-ferrous and non-metallic) polymer safety structure. Polymer safety structures (e.g. polyurethane safety structures) can provide robust protective safety structures for warehouse and factory environments and can include safety barriers, safety bollards, safety rails, posts, bumpers, racking, guards, machine guarding, machine fencing or any other structure for protecting or segregating pedestrians and/or assets from vehicle collisions or for protecting or segregating pedestrians from hazard areas. The one or more magnetic elements may be added to the polymer safety structure as a lining of magnetic material, an embedding of magnetic material or an infusion of magnetic material. The one or more magnetic elements may comprise magnetic strips, magnetic plates, magnetic tape, magnetic particles and/or magnetic paint affixed to or embedded in the polymer safety structure. A specific example of magnetising a safety structure in the form of a magnetised barrier system is described below. In this way, non-ferrous and non-metallic safety structures can be magnetised and monitored for condition and damage.

The damage detection system 100 can advantageously monitor the condition of structures susceptible to damage and detect damage that may otherwise go unnoticed or undetected. The damage detection system 100 can also advantageously complement a collision sensor system to determine whether a collision event is associated with damage to the monitored structure. The damage detection system 100 can also advantageously detect internal structural damage that may be invisible to an inspection of the exterior of the structure.

The magnetised structure 118 may be a structure susceptible to damage. The structure may be a fixed structure, for example, the system 100 may monitor a magnetised post, barrier, racking, walls, machine guarding, machine fencing etc within a warehouse environment. The system 100 may also monitor bollards and barriers in an outdoor environment, such as a construction site, a car park or an airport. The system 100 may monitor a mobile magnetised structure 118, for example sliding racking, sliding barriers, autonomous guided vehicles, mobile robotics or a part of a vehicle.

In some examples, the controller 106 may be located local to the magnetometer 104 in a housing 102. The housing 102 may provide the system 100 as a self-contained unit with the housing 102 being attachable to the magnetised structure 118 for monitoring. In other examples, the system 100 may be integrated into the magnetised structure 118 or into a sub-component of the magnetised structure 118, for example integrated into a safety post or a cap for a safety post. The housing 102 (or safety structure) may have one or more input controls (not shown). For example, the one or more input controls may include one or more function buttons, a touchscreen, switches etc. The controller 106 may be responsive to activation of the one or more input controls to cause the magnetometer 104 to provide a first magnetic field signal or perform a calibration routine (as described below) and/or reset the system 100, for example, by disabling the output signal generator 108.

In some examples, the controller 106 may be located remotely from the magnetometer, for example outside the housing 102 and/or on a server. In such examples, the controller 106 may be coupled to the magnetometer 104 wirelessly and/or via a network. In some examples, the controller 106 may comprise a plurality of processors with one or more processors located locally to the magnetometer 104 (for example in the housing 102) and one or more processors located remotely from the magnetometer 104 (for example outside the housing 102 or on a server). In other words, any functionality of the controller 106 described herein may be performed locally to and/or remotely from the magnetometer 104. The system 100 and/or controller 106 may include a transceiver for communicating with any remote processing device, such as a remote controller 106 or a server.

The controller 106 may receive the first magnetic field signal from the magnetometer 104 as a calibration reference magnetic field as part of a calibration routine. The calibration routine may be performed by the controller 106 at any time including: a time of manufacture, a time of installation, a time of assembly, a time of re-assembly, a time of service and/or a time of relocation. The magnetic field signal measured by the magnetometer 104 may comprise the earth's magnetic field signal in addition to the magnetic field from the magnetised structure 118 and any other static magnetic objects in the vicinity of the system 100. Therefore, the magnetic field signal may vary depending on the location of the system 100. Therefore, a new first magnetic field signal may be received as part of a calibration routine if the system 100 is relocated to a new location.

The controller 106 receives the second magnetic field signal at a second time after receiving the first magnetic field signal. In this way, the controller 106 can compare the second magnetic field signal to the first magnetic field signal to determine any changes in the condition of the magnetised structure 118.

The magnetic field signals may comprise magnetic field measurements along one or more coordinate axes or as an absolute magnitude value with no axial resolution. The controller 106 may determine the magnetic field displacement data, ΔB, based on a difference or ratio between the second magnetic field signal, B2, and the first magnetic field signal, B1, along the one or more axes. For example, the magnetic field displacement data may take the form:

$$\Delta B_{x,y,z} = B2_{x,y,z} - B1_{x,y,z}$$

Or alternatively:

$$\Delta B_{x,y,z} = \frac{B2_{x,y,z}}{B1_{x,y,z}}$$

The controller 106 may determine a condition of the magnetised structure 118 by comparing the magnetic field displacement data, ΔB, to one or more condition thresholds. For example, the controller 106 may compare the magnitude of the magnetic field displacement data, ΔB, to one or more condition thresholds. Alternatively, or in addition, the controller 106 may compare the value of the magnetic field displacement data along one or more or all of the axes to one or more corresponding axial condition thresholds.

The one or more condition thresholds may correspond to different states of the magnetised structure 118. For example, the condition thresholds may correspond to a damage level of the magnetised structure 118. The controller 106 may then determine a damage level of the magnetised structure if a value of the magnetic displacement data exceeds the corresponding damage level condition threshold. The damage level may be qualitive, for example, "light", "medium", "severe", or quantitative with a numeric value based on the value of the magnetic displacement data and/or the exceeded condition threshold. A greater degree of damage may be associated with a higher value of the magnetic field displacement value allowing damage to be quantified. The one or more condition thresholds may also correspond to an assembly status of the magnetised structure 118. The controller 106 may determine an assembly status of the magnetised structure if a value of the magnetic displacement data exceeds the corresponding assembly status condition threshold. The assembly status condition thresholds may be higher than the damage level thresholds. For example, for a system 100 monitoring a magnetised safety barrier, the magnetic displacement data will have a larger magnitude if the barrier has been removed rather than damaged. Therefore, an assembly condition threshold may be higher than a damage threshold. The controller 106 may determine the magnetised structure to be in an undamaged and correctly assembled state if a value of the magnetic field displacement data is less than all the condition thresholds and/or less than an acceptable deviation threshold.

The controller 106 may receive a plurality of further magnetic field signals and determine the magnetic displacement data based on the further magnetic field signals. The controller 106 may determine the magnetic displacement data based on a difference between the further magnetic field signals and the first magnetic field signal. The controller 106 may receive the further magnetic field signals from the magnetometer 106 periodically during monitoring, for example according to a schedule, or otherwise on demand. As an example, the controller 106 may receive a further magnetic field signal at a regular time interval, for example, hourly, daily, weekly etc. In this way, the controller 106 can monitor the condition of the magnetised structure 118 at regular intervals. The controller 106 may receive further magnetic field signals at a time when it is known that no vehicles are present (for example at night). In this way, the magnetic field signal of the magnetised structure 118 can be periodically measured to ensure an undamaged, correctly assembled condition is constantly obtained.

In some examples, the controller 106 may update or replace the first magnetic field signal with the second magnetic field signal or a further magnetic field signal if a difference between the two signals is less than a difference threshold. In this way, any drift in the sensitivity of the magnetometer 104, system 100 or magnetisation of the magnetised structure 118 will not accumulate and result in false alarms.

In this example, the system 100 further comprises an output signal generator 108 and the controller 106 may output a condition signal indicative of the condition of the magnetised structure 118. The output signal generator 108 may comprise an audible signal generator, such as a siren, or a visible signal generator such as a (flashing) light or a display screen displaying warning messages. In this way, the output signal generator 108 can alert pedestrians and vehicle drivers of any potential hazard arising from damage to, or incorrect assembly of, the magnetised structure 118. For example, a warning display may indicate a temporary vehicle speed limit or a no entry alert until the magnetised structure 118 is inspected and/or repaired. The controller 106 may activate the output signal generator 108 if the condition of the magnetised structure corresponds to a damage level or incorrect assembly.

The output signal generator 108 may comprise a transmitter configured to transmit the condition signal and/or the magnetic field displacement data to an external device. For example, the transmitter may transmit the condition signal to a remote server, a remote device and/or a mobile device. In this way, the system 100 can alert a user to a condition of the magnetised structure 118 and may indicate a potential requirement for inspection and/or repair. The condition signal may comprise a data signal including any of the magnetic field sensor signals, the magnetic field displacement data and/or the condition of the magnetised structure 118. Data from the condition signal may also be stored locally or at the remote server for analysis. In this way, data can be captured for the sensor system 100 for indicating how many collisions and/or disassembly events the magnetised structure 118 is exposed to, for example, on a daily, weekly or monthly basis.

In the illustrated example, the output signal generator 108 is shown within the housing 102. In other examples, the output signal generator 108 may be outside the housing 102 and may communicate with the controller 106 via wired or wireless means. For example, an output signal generator 108 may comprise an audible or visible signal generator located on a wall close to the sensor system.

The system 100 may include a power source (not shown). If the system 100 is associated with a fixed magnetised structure 118, the power source may comprise a battery. Magnetometers can have a high power consumption and consume a non-negligible current. Therefore, in one or more examples, the system 100 may be configured to operate in a sleep mode or idle mode. The system 100 may operate in a sleep mode as a default state. In the sleep mode, the magnetometer 104 may be disabled such that it does not consume any power (or only a negligible amount), In the sleep mode, the controller 106 may also operate in a reduced state. For example, the controller 106 may only perform essential functions such as listening for trigger signalling to wake the system from the sleep mode. In this way, the system 100 operates in a sleep mode in which battery power is conserved.

The system 100 (or controller 106) may receive trigger signalling to wake the system 100 from the sleep mode. The controller 106 may selectively activate the magnetometer 104 in response to the trigger signalling and receive a (second or further) magnetic field signal from the magnetometer 104. The trigger signalling may comprise a periodic trigger signal according to a monitoring schedule. For example, the controller 106 may activate the magnetometer and receive a further magnetic field signal at regular time intervals, for example, hourly, daily, weekly etc.

The system 100 may receive the trigger signalling as an on-demand signal from a trigger sensor. The trigger sensor may be responsive to: motion of an object within a predetermined radius of the magnetometer; and/or an impact of an object with the magnetised structure 118. The controller 106 may activate the magnetometer 104 in response to the trigger signalling and receive an on-demand magnetic field signal. The controller 106 can then determine magnetic field displacement data based on a difference between the on-demand magnetic field signal and the first magnetic field signal. The controller 106 may determine a condition of the magnetised structure 118 based on the magnetic field displacement data as described above. In some examples, the system 100 may further comprise the trigger sensor. The trigger sensor may be a low-power device that can remain active during the sleep mode.

In some examples, the trigger sensor may comprise a mechanical sensor, for example a vibration or impact sensor such as an accelerometer. The mechanical sensor may form part of a collision sensor system. In some examples, the damage detection system 100 may form part of the collision sensor system. The mechanical sensor may detect vibration resulting from motion of an object (such as a passing vehicle) or from a collision of an object with the system 100 or the magnetised structure 118. The mechanical sensor can detect a vibration/impact and, if a magnitude of the vibration is greater than a potential damage threshold, the controller 106 may receive the trigger signalling from the mechanical sensor and activate the magnetometer 104.

The controller 106 can activate the magnetometer 104, receive an on-demand magnetic field signal and determine the magnetic field displacement data and the condition of the magnetised structure 118 to determine if the detected vibration is associated with structural damage to the magnetised structure 118. In this way, the system 100 can provide damage detection functionality for complementing a collision sensor. By determining the condition of the magnetised structure 118, the system 100 can distinguish vibrations at the magnetised structure 118 resulting from potentially damaging collisions from those arising from low-risk vibrations such as a pedestrian brushing past the structure. Therefore, the system 100 can reduce false alarms in a collision sensor system.

In some examples, the trigger sensor may comprise an optical sensor for detecting motion. An optical sensor may comprise a passive infrared (PIR) sensor that can detect motion of an object within a predefined radius. The controller 106 may receive signals from the PIR sensor and activate the magnetometer in response to movement of an object within the predefined radius. In some examples, the controller 106 may receive a motion signal from the optical sensor and activate the magnetometer 104 following detection of a moving object. The controller 106 may receive on-demand magnetic field signals from the magnetometer 104 at regular intervals (for example multiple measurements per second) until the motion signal indicates that motion is no longer present. In this way, the damage detection system 100 can capture magnetic field signals and monitor the condition of the magnetised structure 118 throughout the entire motion event. If the moving object damages the magnetised structure, the system 100 can capture a transient damage profile of the collision.

In other examples, the controller 106 may receive a motion signal from the optical sensor and only activate the magnetometer 104 when the motion signal indicates that a motion event has completed (motion is no longer detectable). As a result, the damage detection system 100 can determine the condition of the magnetised structure 118 after completion of a motion event. In this way, any effect of the moving object, which may itself comprise ferromagnetic material, on the measured magnetic field signals can be reduced.

In response to on demand trigger signalling from any trigger sensor, the controller 106 may receive a plurality of on-demand magnetic field signals from the magnetometer 104. The controller 106 may determine transient magnetic field displacement data comprising a plurality of magnetic field displacements corresponding to a difference or ratio between a corresponding on-demand magnetic field signal and the first magnetic field signal. The controller 106 may determine a transient damage profile of the magnetised structure 118 based on the transient magnetic field displacement data. The controller 106 may store the transient damage profile or transmit it to the server or remote device for analysis of the collision event.

Vehicles, particularly FLTs and heavy vehicles (HVs), typically have a substantial mass of ferromagnetic (or ferrous) material. As the vehicle moves, it disturbs the Earth's magnetic field. Therefore, a vehicle passing close to the magnetometer 104 can also result in non-zero magnetic field displacement data in a similar way to damage or disassembly of the magnetised structure 118. The controller 106 can distinguish a change in condition of the magnetised structure 118 from a passing vehicle in at least two ways. Firstly, the magnetised structure 118 may have a magnetic field of sufficient strength that the value of magnetic field displacement data corresponding to damage or disassembly of the magnetised structure 118 will be much greater than the value of the magnetic field displacement data corresponding to the passing vehicle. As a result, a first damage level threshold may be greater than the value of the magnetic field displacement data corresponding to a vehicle passing within a detection range of the magnetometer 104.

A second way that the controller 106 can distinguish a change in condition of the magnetised structure 118 from a passing vehicle is based on the permanent change to the received magnetic field signals resulting from damage or disassembly. For a passing vehicle, the magnetic field displacement data will reduce and potentially return to zero once the vehicle has passed. For damage or disassembly, the magnetic field displacement data will not reduce or return to zero. Therefore, following receipt of the on-demand magnetic field signal, the controller 106 can continue to receive on-demand magnetic field signals at regular intervals until the magnetic field displacement data reaches a steady state value (indicating that any vehicle is stationary, has left the detection range of the magnetometer 104 or that the vibration did not result from a vehicle). The controller 106 may then determine the magnetic field displacement data based on a difference between the steady state value of the on-demand magnetic field signal and the first magnetic field signal and determine a condition of the magnetised structure 118.

In some examples, the damage detection system 100 may make use of the magnetic field disturbance caused by passing vehicles to determine if an object indicated by trigger signalling (motion or vibration) is a vehicle. For example, the controller 106 may determine magnetic field displacement data based on a difference between an on-demand magnetic field signal and the first magnetic field signal. The controller 106 may determine the object to be a vehicle if the magnetic field displacement data exceeds one or more displacement thresholds. For example, if the magnetic field displacement data is greater than one or more displacement thresholds, the controller 106 may determine the object to be a vehicle, otherwise the controller 106 may determine the object to not be a vehicle (for example a pedestrian) and return the system 100 to the sleep mode. If the object is determined to be a vehicle, the system may maintain the magnetometer 104 in an active state until the magnetic field displacement data remains below one or more sleep thresholds for a predetermined period. This can ensure a full data capture of any vehicle detection events.

The one or more displacement thresholds may be less than the condition thresholds corresponding to damage levels and disassembly of the magnetised structure. In this way, the controller 106 can distinguish vehicle presence from a change in condition of the magnetised structure.

In response to determining that an object is a vehicle, the controller may collect a plurality of on-demand magnetic field signals and determine transient magnetic field displacement data as described above. The controller 106 may determine any of a position, speed, velocity, trajectory or presence of the vehicle based on the transient magnetic field displacement data. In some examples, magnetic properties of the vehicle may be predetermined. For example, in a warehouse setting, forklift trucks each having substantially the same mass of ferromagnetic material may be the only vehicle type for detection. The controller 106 may be preconfigured or programmed with a conversion factor for converting a value of the magnetic field displacement in one or more axes with a corresponding distance to the forklift truck along the one or more axes. In other examples, the controller 106 may receive an identification signal from the vehicle and identify the magnetic properties or ferromagnetic mass of the vehicle based on the identification signal. In this way, the controller 106 may determine the position and dynamic properties of the vehicle.

The controller 106 may activate the output signal generator 108 based on the position and/or dynamic properties of the vehicle. For example, if a trajectory of the vehicle is incident on the magnetised structure, the controller may activate the output signal generator to produce an alert signal to alert the vehicle driver. In examples with a mechanical trigger sensor, the damage detection system 100 may form part of a collision sensor system in which the system 100 can provide the multi-functionality of: (i) alerting approaching vehicles of a collision risk; (ii) determining if a detected vibration or collision is associated with a vehicle; and (iii) determining a damage level of a collision.

Figure 2A:
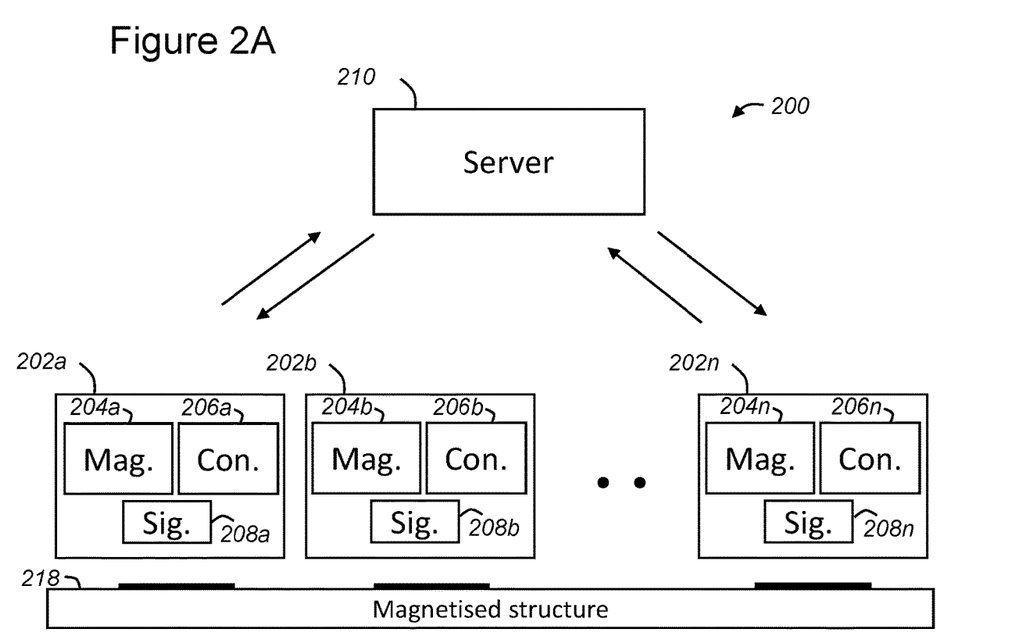
FIG. 2A illustrates a schematic overview of a further damage detection system according to an embodiment of the disclosure.

FIG. 2A illustrates a schematic overview of another damage detection system 200 according to an embodiment of the present disclosure. Features of FIG. 2A already described above in relation to FIG. 1 have been given corresponding reference numbers in the 200 series and will not necessarily be described again here.

The system 200 includes a plurality of sub-systems each monitoring a different part of the same magnetised structure 218. For example, each sub-system may monitor each leg or shelf of a racking unit in a warehouse or each post in a safety barrier system. In other examples, one or more sub-systems may monitor separate magnetised structures. Each sub-system comprises a housing 202a, 202b, 202n including a magnetometer 204a, 204b, 204n and a controller 206a, 206b, 206n. Each sub-system also comprises a transceiver (not shown) that can communicate with a server 210. The server 210 may comprise a user interface or may communicate with other devices having a user interface such as a personal mobile device or a computer. In this way, the server 210 may collect data from each of the sub-systems to monitor each part of the magnetised structure 218. The system 200 may determine one or more parts of the structure 218 that have been damaged or disassembled. In this way, the system can alert a user that a specific part of the structure requires inspection, temporary safety measures (safety cordons, speed limits, one-way limits etc) and/or repair. The system 200 can analyse the monitoring data to identify parts of the magnetised structure 218 that have a frequency of damage or disassembly greater than a tolerance threshold. In a warehouse or factory environment, a user can implement changes to the structural layout (such as rearranging the layout, implementing protective measures etc) to improve the safety of the environment.

In the example of FIG. 2A, each sub-system has a dedicated magnetometer 204a, 204b, 204n and a dedicated local controller 206a, 206b, 206c for implementing the controller functionality as described above in relation to FIG. 1.

Each sub-system also has a dedicated output signal generator 208. In other examples, the sub-systems may be communicatively coupled with a common output signal generator. For example, two or more sub-systems may be wirelessly coupled to the same audible or visible output signal generator and/or to a common gateway that can perform some functionality of the controller 206 and/or pass information to and from the server 210.

Figure 2B:
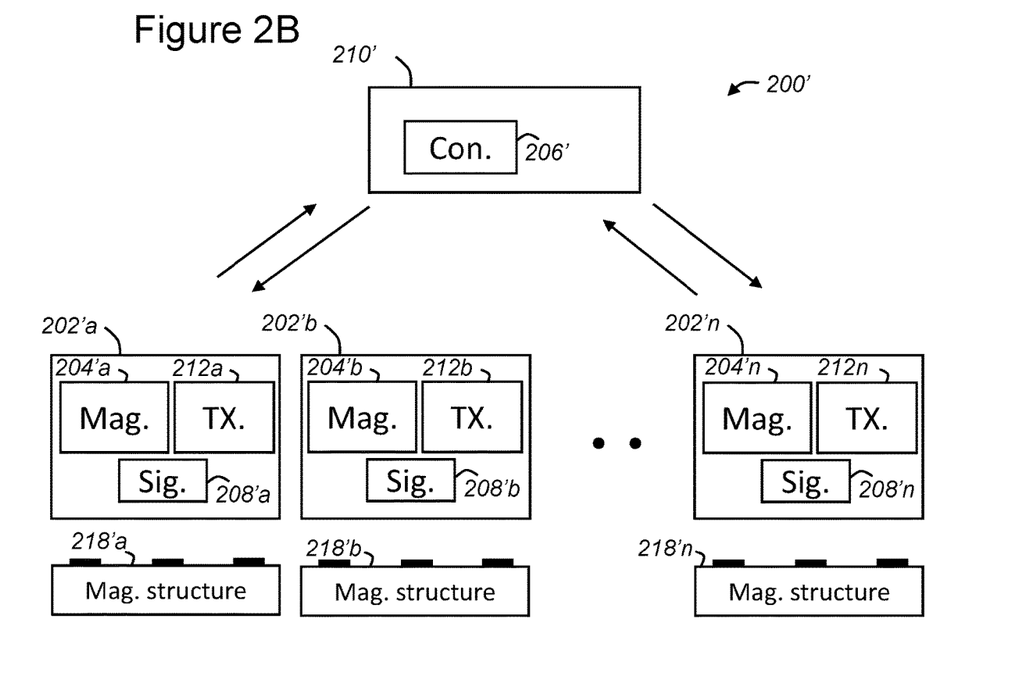
FIG. 2B illustrates a schematic overview of a yet further damage detection system according to an embodiment of the disclosure.

FIG. 2B illustrates a schematic overview of a further damage detection system 200' according to an embodiment of the present disclosure. Features of FIG. 2B already described above in relation to FIG. 1 have been given corresponding reference numbers in the 200' series and will not necessarily be described again here.

In this example, the system 200' again includes a plurality of sub-systems. In this example, each sub-system monitors a respective separate magnetic structure 218'a, 218'b, 218'n. A further difference compared to the system of FIG. 2A is that the controller 206' is located at the server 210' and provides the functionality described above in relation to FIG. 1 for a plurality of the sub-systems. Each sub-system comprises a housing 202'a, 202'b, 202'n including a magnetometer 204'a, 204'b, 204'n and a transceiver 212'a, 212'b, 212'c. In this example, the sub-systems act as dumb devices in that the transceivers 212'a, 212'b, 212'n transmit signals from the corresponding magnetometer 204'a, 204'b, 204'n to the controller 206' for processing and receive signals from the controller 206' for activating a corresponding output signal generator 208'a, 208'b, 208'n. In this way, the functionality of the controller 206' described in relation to FIG. 1 is implemented at the server 210'.

FIGS. 2A and 2B respectively describe examples in which the controller functionality is implemented local to the sub-system or on the server. It will be appreciated that in other examples any elements of the functionality of the controller described in relation to FIG. 1 may be performed local to the sub-system or remote from the sub-system on the server.

Figure 3A:
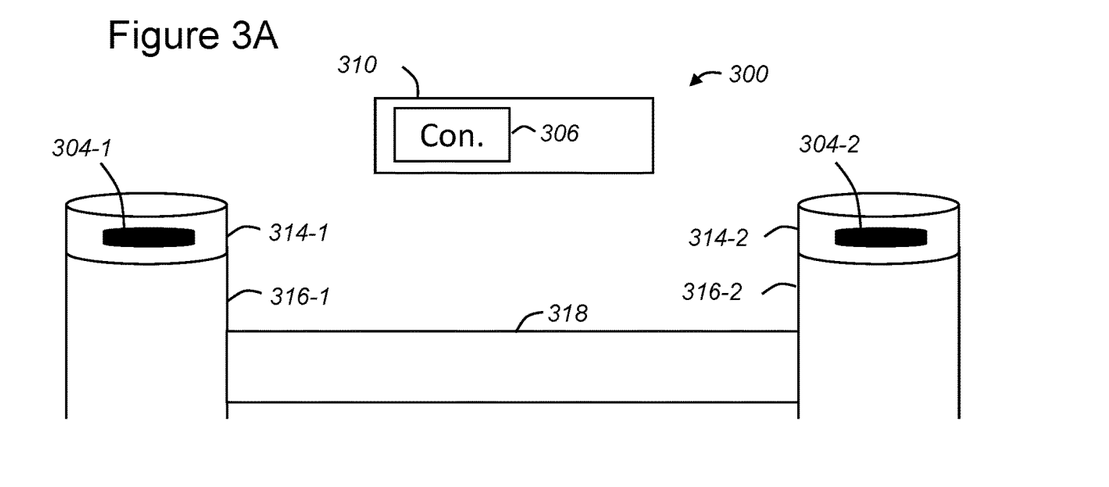
FIG. 3A illustrates an implementation of a damage detection system implemented in a safety structure at a first time according to an embodiment of the disclosure.
Figure 3B:
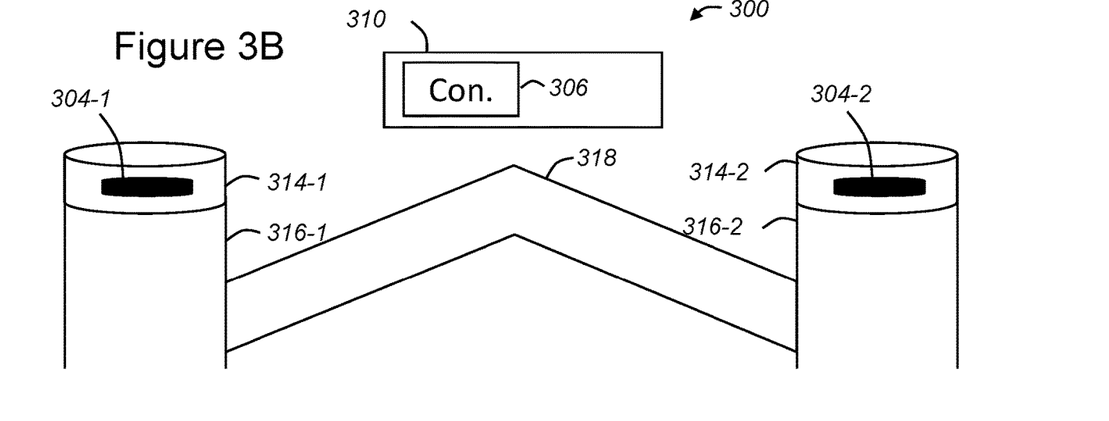
FIG. 3B illustrates the implementation of the damage detection system of FIG. 3A at a second time according to an embodiment of the disclosure.
Figure 3C:
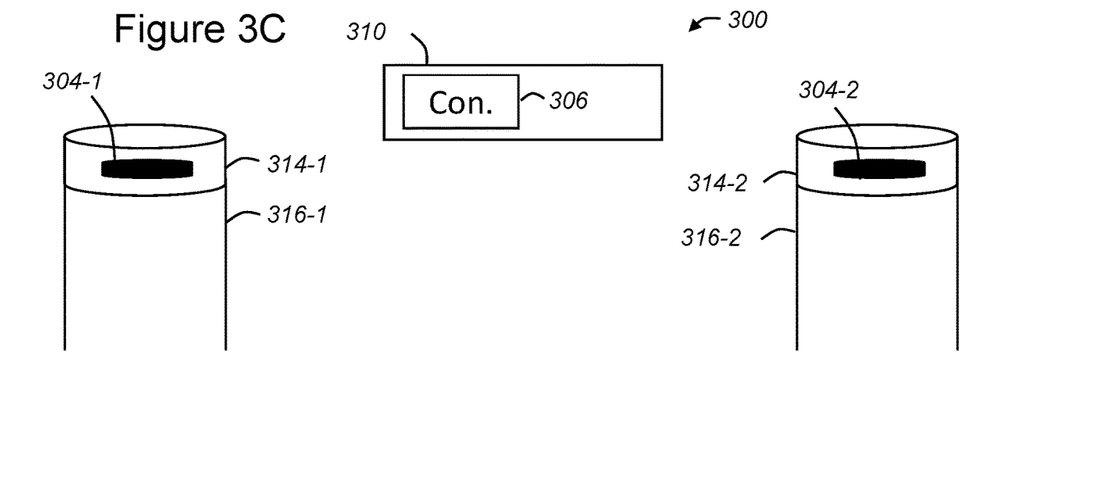
FIG. 3C illustrates the implementation of the damage detection system of FIG. 3A at a third time according to an embodiment of the disclosure.

FIGS. 3A to 3C illustrate an example implementation of a damage detection system according to an embodiment of the disclosure. In this example, damage detection system 300 comprises a plurality of magnetometers 304-1, 304-2 integrated into caps 314-1, 314-2 of safety posts 316-1, 316-2 of a smart barrier system. The system 300 further comprises a controller 306 located on a server 310 in communication with the magnetometers 304-1, 304-2. The system 300 further comprises one or processors and a transceiver (not shown) co-located with each magnetometer 304-1, 304-2 inside the caps 314-1, 314-2. In this way, each cap forms a sub-system similar to that described in relation to FIG. 2B. The one or more processors and transceiver enable communication of magnetic field signals and condition signals to and from the controller 306 and processing of such signals. It will be appreciated that other architectures, such as a plurality of independent sub-systems as described in relation to FIG. 2A can provide the same functionality as the illustrated system 300. The magnetometers 304-1, 304-2 of the damage detection system 300 are arranged to monitor a magnetised safety barrier 318 extending between the safety posts 316-1, 316-2.

In this example, each sub-system in caps 314-1, 314-2 includes a low-power trigger sensor in the form of an accelerometer (not shown).

At a first time, the controller 306 receives a first magnetic field signal of the magnetised structure 318 from each of the magnetometers 304-1, 304-2. The controller 306 may receive the first magnetic field as part of a calibration routine when the barrier system is first installed.

At a second time, illustrated in FIG. 3A, the controller receives a second magnetic field signal of the magnetised structure 318 from each of the magnetometers 304-1, 304-2. The controller 306 determines magnetic field displacement data based on a difference between the second magnetic field signals and the respective first magnetic field signals. As the magnetised structure 318 has not been moved or damaged since installation, the value of the magnetic field displacement data is zero or close to zero. The controller 306 determines the condition of the magnetised structure 318 to be correctly installed and undamaged because the value of the magnetic field displacement data is less than all condition thresholds and a tolerable deviation threshold.

The controller 306 may continue to receive further magnetic field signals from the magnetometers 304-1, 304-2 at regular intervals to continuously monitor the condition of the barrier system. The system 300 operates in a sleep mode between the regular intervals. In the sleep mode, the magnetometers 304-1, 304-2 are disabled and the accelerometers are active.

At a later time, illustrated in FIG. 3B, the controller 306 receives trigger signalling from the accelerometers in two of the caps 314-1, 314-2 in response to a vehicle collision. The controller 306 activates the magnetometers 304-1, 304-2, corresponding to the caps 314-1, 314-2 and receives on-demand magnetic field signals. The controller 306 receives a plurality of on-demand magnetic field signals from each magnetometer 304-1, 304-2 and determines transient magnetic field displacement data based on differences between each of the on-demand magnetic field signals and the respective first magnetic field signal for each magnetometer 304-1, 304-2. After the on-demand magnetic field signals settle to a constant steady-state value, the controller 306 determines the condition of the magnetised structure 318 based on the magnetic field displacement data. The controller 306 determines the condition of the magnetised structure 318 to be severely damaged because the value of the magnetic field displacement data is greater than a severe damage-level condition threshold. The controller 306 may determine a transient damage profile and/or dynamic properties of the vehicle (if the vehicle contains ferrous material) based on the transient magnetic field displacement data.

The controller 306 may activate an output signal generator to alert a user that the magnetised structure 318 is damaged. For example, the server may communicate with a mobile device of the user which may host a mobile application in communication with the server 310 and controller 306. The user can then take remedial action including, inspection of the area, cordoning off the area, introduction of speed limits etc. The controller 306 may activate a visible or audible output signal generator local to the magnetised structure 318 to alert users close to the barrier system. The output signal generator may comprise a display screen providing messages including temporary speed limits, temporary access limits etc.

The controller 306 may compare first magnetic field displacement data corresponding to a first magnetometer 304-1 to second magnetic field displacement data corresponding to the second magnetometer 304-2 in order to determine a location of damage on the magnetised structure based on the comparison. For example, the controller 306 may simply determine a location of the damage to be closer to a particular cap 314-1, 314-2 corresponding to the higher value of magnetic field displacement data. As a further example, the controller 306 may calculate a ratio of values of the magnetic field displacement data for the first and second magnetometers 304-1, 304-2 in one or more axes. The controller 306 may then determine a position of damage along a length extending between the first and second magnetometers 304-1, 304-2 based on the calculated ratio. As an example, for a calculated ratio of 2:1 in the magnitude of the displacement data for the first magnetometer 304-1 relative to the second magnetometer 304-2, the controller may determine the position of the damage to be approximately one third of the way along the length extending from the first magnetometers 304-1 to the second magnetometer 304-2. To enable the position determination, each magnetometer may be calibrated to ensure they have the same sensitivity and proportionality for a test magnetic source. In this way, the controller 306 is configured to receive a first supplementary magnetic field signal and a second supplementary magnetic field signal from the second magnetometer 304-2 monitoring the magnetised structure 318; determine supplementary magnetic field displacement data for the magnetised structure 318 based on the first supplementary magnetic field signal and the second supplementary magnetic field signal; and determine a location of damage on the magnetised structure 318 based on a comparison between the magnetic field displacement data and the supplementary magnetic field displacement data.

At a yet later time, illustrated in FIG. 3C, the controller 306 receives a further magnetic field signal of the magnetised structure 318 from each of the magnetometers 304-1, 304-2. The controller 306 determines the magnetic field displacement data accordingly and determines the condition of the magnetised structure 318 to be disassembled because the value of the magnetic field displacement data is greater than a disassembly status condition threshold. The controller 306 may activate the output signal generator as described above in relation to FIG. 3B.

In a magnetised barrier system such as that of FIGS. 3A to 3C, the magnetised barrier 318 may comprise a safety barrier and a plurality of magnetic elements coupled to the safety barrier. In some examples, the magnetised barrier 318 may comprise a wire extending through an opening along an axis (or length) of the safety barrier with a plurality of (identical) magnetic elements coupled to, and (periodically) spaced along, a length of the wire. The wire may be held under tension within the safety barrier, for example each end of the wire may be affixed to each end of the magnetised barrier or affixed to each adjacent post 316-1, 316-2. It should be understood that in this context, the term barrier can relate to any horizontal safety structure, such as barriers, fencing, railings etc.

In response to a collision on the magnetised barrier 318 the wire and magnetic elements can vibrate in an oscillatory fashion. The controller 306 may receive a plurality of further magnetic field signals from each magnetometer 304-1, 304-2 to detect the dynamics of this oscillatory motion. For example, in response to trigger signalling from the accelerometer, the controller 306 may receive a plurality of further magnetic field signals from each magnetometer 304-1, 304-2 and then determine first and second dynamic magnetic field displacement data based on a difference between each further magnetic field signal and a respective first magnetic field signal for each magnetometer 304-1, 304-2. In the same way as described above for a location of damage, the controller 306 may determine a position of impact on the magnetised structure 318 based on a comparison between the first and second dynamic magnetic field displacement data. In addition, the controller 306 may determine a force of impact based on the first dynamic magnetic field displacement data and/or the supplementary dynamic magnetic field displacement data. For example, for a sinusoidal like oscillation, the controller 306 may determine an energy (or force) of impact based on an amplitude, frequency and/or decay rate of the first and/or second dynamic field displacement data. For example, the amplitude of oscillation may increase in dependence of the energy of impact. In some examples, the controller 306 may compare the oscillation parameters (amplitude, frequency, decay) against reference values that have been predetermined as part of a calibration routine for the magnetised safety barrier 318. As before, after the (first and/or second) magnetic field displacement data reaches a steady-state value, the controller 306 can determine a condition of the magnetised structure 318.

Figure 4:
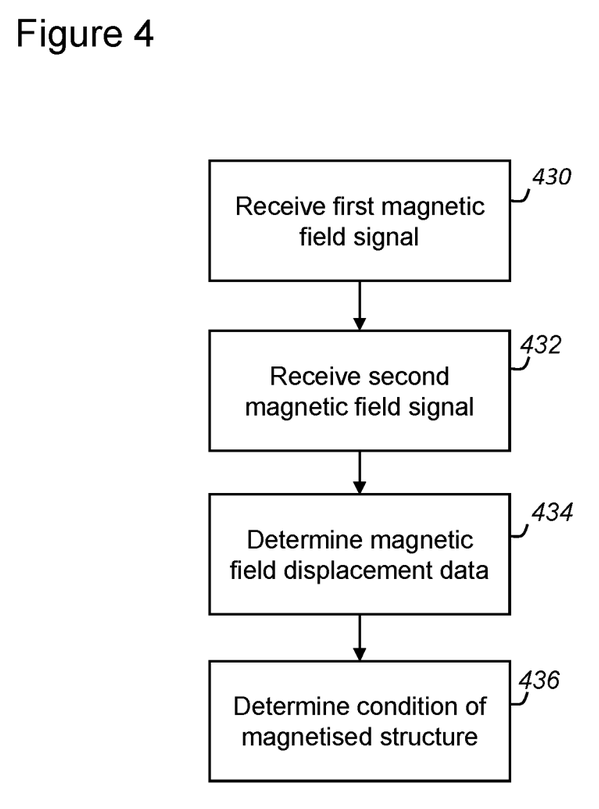
FIG. 4 illustrates a flow diagram for a method for monitoring a magnetised structure for damage according to an embodiment of the present disclosure.

FIG. 4 illustrates a flow diagram for a method for monitoring a magnetised structure for damage according to an embodiment of the present disclosure. The method may be a computer implemented method performed on a processor or a controller, such as the controllers described in relation to any of the systems disclosed herein.

A first step 430 comprises receiving a first magnetic field signal of the magnetised structure from a magnetometer. The first magnetic field signal may comprise a reference or calibration magnetic field signal. A second step 432 comprises receiving a second magnetic field signal from the magnetometer. A third step 434 comprises determining magnetic field displacement data based on the second magnetic field signal and the first magnetic field signal. For example, the magnetic field displacement data may comprise a difference or ratio between the second magnetic field signal and the first magnetic field signal. A fourth step 436 comprises determining a condition of the magnetised structure based on the magnetic field displacement data. The method may comprise activating an output signal generator for indicating the condition of the magnetised structure. The controller may determine the condition of the magnetised structure based on comparison of the value of the magnetic field displacement data with one or more condition thresholds including: a tolerable deviation threshold (indicating undamaged and correct assembly); one or more damage level condition thresholds; and one or more assembly status thresholds.

The disclosed damage detection systems can advantageously complement a collision sensor system monitoring a structure to distinguish false alarms and minor vibration events from damaging collisions.

Figure 5:
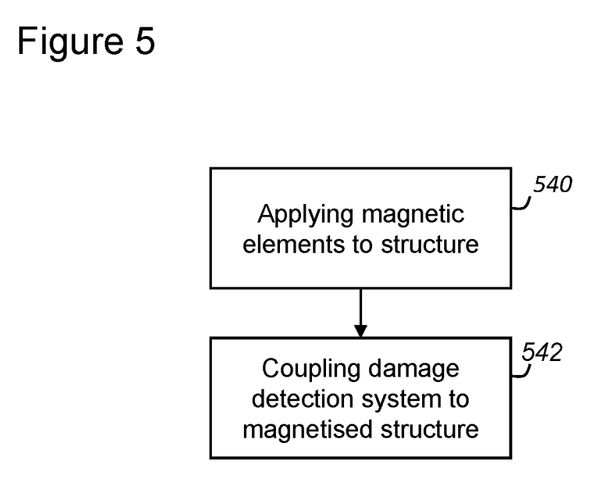
FIG. 5 illustrates a flow diagram for a method of installing a damage detection system according to an embodiment of the present disclosure.

FIG. 5 illustrates a flow diagram of installing any of the damage detection systems disclosed herein, according to an embodiment of the present disclosure.

A first step 540 comprises applying magnetic elements to a structure to provide the magnetised structure. Applying the magnetic elements may comprise any of magnetic strips, magnetic plates, magnetic tape, magnetic particles and/or magnetic paint to the structure, A second step 542 comprises coupling the damage detection system to the magnetised structure. Coupling the damage detection system to the magnetised structure may comprise: attaching (parts of) the damage detection system to the magnetised structure with appropriate fixings; locating (parts of) the damage detection system close to the magnetised structure (such that the damage detection system can detect the magnetic field that is generated by the magnetic structure); and/or integrating (parts of) the damage detection system within the magnetised structure (such as the caps of FIGS. 3A to 3C).

The invention claimed is:

1. A damage detection system for monitoring a magnetized structure for damage comprising:
a safety structure comprising:
the magnetized structure, wherein the magnetized structure comprises ferromagnetic material and creates its own magnetic field; and
a magnetometer; and
a controller configured to:
receive a first magnetic field signal of the magnetized structure from the magnetometer;
receive a second magnetic field signal of the magnetized structure from the magnetometer;
determine magnetic field displacement data based on the second magnetic field signal and the first magnetic field signal; and
determine a condition of the magnetized structure based on the magnetic field displacement data.

2. The damage detection system of claim 1, wherein the controller is configured to determine the condition of the magnetized structure based on a magnitude of a magnetic field displacement in one or more axes.

3. The damage detection system of claim 2, wherein the controller is configured to determine the condition of the magnetized structure by comparing the magnitude of the magnetic field displacement in one or more axes to one or more condition thresholds.

4. The damage detection system of claim 1, wherein the condition of the magnetized structure comprises one or both of:
a damage level of the magnetized structure; and
an assembly status of the magnetized structure.

5. The damage detection system of claim 1, wherein the controller is configured to receive the first magnetic field signal as a calibration magnetic field signal as part of a calibration routine.

6. The damage detection system of claim 1, wherein the controller is configured to output a condition signal indicative of the condition of the magnetized structure.

7. The damage detection system of claim 6, wherein the controller is configured to output the condition signal by one or more of:
activating an audible visual indicator;
activating a visual indicator;
transmitting condition data to an external controller; and
transmitting the magnetic field displacement data to an external controller.

8. The damage detection system of claim 1, wherein:
the controller is co-located with the magnetometer;
the controller is coupled to the magnetometer via a network; or
the controller comprises a plurality of processors distributed between being co-located with the magnetometer or coupled to the magnetometer via the network.

9. The damage detection system of claim 1, wherein the controller is further configured to:
receive trigger signaling;
selectively activate the magnetometer in response to the trigger signaling; and
receive a magnetic field from the magnetometer.

10. The damage detection system of claim 9, wherein the trigger signaling comprises:
a periodic trigger signal for selectively activating the magnetometer and receiving a magnetic field according to a monitoring schedule; or
an on-demand signal from a trigger sensor responsive to one or both of:
motion of an object within a predetermined radius of the magnetometer; and
impact of an object with the magnetized structure.

11. The damage detection system of claim 10, comprising the trigger sensor.

12. The damage detection system of claim 1 further comprising one or more magnetic elements for magnetizing a structure.

13. The damage detection system of claim 1, wherein the magnetizing structure comprises a polymer safety structure and one or more magnetic elements for magnetizing the polymer safety structure.

14. The damage detection system of claim 13, wherein the magnetic elements comprise one or more of:
a lining of magnetic material on the polymer safety structure;
an infusion of magnetic material in the polymer safety structure;
magnetic material embedded in the safety polymer structure; and
one or more of a magnetic strip, a magnetic plate, magnetic tape, magnetic particles, and magnetic paint affixed to the polymer safety structure.

15. The damage detection system of claim 1, wherein the controller is further configured to:
- receive a first supplementary magnetic field signal and a second supplementary magnetic field signal from a second magnetometer monitoring the magnetized structure;
- determine supplementary magnetic field displacement data for the magnetized structure based on the first supplementary magnetic field signal and the second supplementary magnetic field signal; and
- determine a location of damage on the magnetized structure based on a comparison between the magnetic field displacement data and the supplementary magnetic field displacement data.

16. The damage detection system of claim 1 wherein the safety structure comprises a structure for protecting or segregating assets or pedestrians from vehicles or a structure for protecting or segregating pedestrians from hazard areas.

17. The damage detection system of claim 1, further comprising:
- a plurality of magnetometers, wherein each magnetometer is coupled to a corresponding transceiver; and
- a server configured to communicate with each of the plurality of magnetometers via the corresponding transceiver.

18. A magnetized safety barrier system comprising:
the damage detection system of claim 15;
the second magnetometer; and
a magnetized safety barrier,
wherein the magnetometer is associated with a first end of the magnetized safety barrier and the second magnetometer is associated with a second end of the magnetized safety barrier.

19. The magnetized safety barrier system of claim 18, wherein the magnetized safety barrier comprises:
- a safety barrier;
- a wire extending through an opening along an axis of the safety barrier; and
- a plurality of magnetic elements affixed to and spaced along a length of the wire.

20. A computer implemented method of monitoring a magnetized structure of a safety structure for damage, the safety structure comprising:
- the magnetized structure, wherein the magnetized structure comprises ferromagnetic material and creates its own magnetic field; and
- a magnetometer, the method comprising:
- receiving a first reference magnetic field of the magnetized structure from a magnetometer arranged to monitor the magnetized structure;
- receiving a second reference magnetic field of the magnetized structure from the magnetometer;
- determining magnetic field displacement data based on the second reference magnetic field and the first reference magnetic field; and
- determining a condition of the magnetized structure based on the magnetic field displacement data.

* * * * *